(12) United States Patent
Han et al.

(10) Patent No.: US 9,658,596 B2
(45) Date of Patent: May 23, 2017

(54) APPARATUS AND METHOD FOR ADJUSTING HOLOGRAPHIC IMAGE

(71) Applicant: SAMSUNG ELECTRONICS CO., LTD., Suwon-si (KR)

(72) Inventors: Seung Ju Han, Seoul (KR); Joon Ah Park, Hwaseong-si (KR); Bho Ram Lee, Seongnam-si (KR); Hyun Jeong Lee, Hwaseong-si (KR); Soo Chul Lim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 626 days.

(21) Appl. No.: 13/788,437

(22) Filed: Mar. 7, 2013

(65) Prior Publication Data
US 2014/0071506 A1   Mar. 13, 2014

(30) Foreign Application Priority Data

Sep. 13, 2012 (KR) .......................... 10-2012-0101411

(51) Int. Cl.
G03H 1/08   (2006.01)
G03H 1/00   (2006.01)
G03H 1/22   (2006.01)
G06F 3/01   (2006.01)

(52) U.S. Cl.
CPC ............. *G03H 1/08* (2013.01); *G03H 1/0005* (2013.01); *G03H 1/2294* (2013.01); *G06F 3/016* (2013.01); *G06F 3/017* (2013.01); *G03H 2001/0061* (2013.01); *G03H 2226/05* (2013.01)

(58) Field of Classification Search
CPC ....... G03H 1/08; G03H 1/0005; G03H 1/2294
See application file for complete search history.

(56) References Cited

U.S. PATENT DOCUMENTS

| 6,211,848 | B1 | 4/2001 | Plesniak et al. |
| 7,190,496 | B2 * | 3/2007 | Klug et al. ....................... 359/23 |
| 2004/0080716 | A1 | 4/2004 | Anderson et al. |
| 2007/0132721 | A1 | 6/2007 | Glomski et al. |
| 2007/0247393 | A1 | 10/2007 | Kuroki et al. |
| 2008/0030819 | A1 | 2/2008 | Klug et al. |
| 2008/0040689 | A1 | 2/2008 | Balakrishnan et al. |
| 2009/0076766 | A1 | 3/2009 | Fein et al. |
| 2009/0237763 | A1 * | 9/2009 | Kramer et al. ................. 359/23 |

FOREIGN PATENT DOCUMENTS

| KR | 10-2006-0027167 | 3/2006 |
| KR | 10-2011-0045686 | 5/2011 |
| KR | 10-2011-0088969 | 8/2011 |

* cited by examiner

*Primary Examiner* — Jennifer L. Doak
(74) *Attorney, Agent, or Firm* — NSIP Law

(57) ABSTRACT

A holographic object processing apparatus and method are provided. The holographic object processing apparatus may include a display device to output a holographic object, a database (DB) to store change information of the holographic object according to a distance between a control object and the holographic object, a distance measurement sensor to measure the distance between the control object and the holographic object, and a processing unit to extract change information corresponding to the measured distance from the DB and change the holographic object based on the extracted change information. The display device may output the changed holographic object.

19 Claims, 10 Drawing Sheets

FIG. 3

| LAYER | CHANGE INFORMATION | EXAMPLE |
|---|---|---|
| 311 — FIRST LAYER (0~10cm) | 321 ENLARGE | ○ → ◯ |
| 312 — SECOND LAYER (10~20cm) | 322 CHANGE COLOR | ○ → ● |
| 313 — THIRD LAYER (20cm~) | 323 NO CHANGE | ○ → ○ |

FIG. 5

| LAYER | CHANGE INFORMATION | EXAMPLE |
|---|---|---|
| A LAYER (0~5cm) | ENLARGE 521 | ○ → ◯ |
| B LAYER (5cm~) | REDUCE RESOLUTION 522 | ● → ● |

511 — A LAYER row
512 — B LAYER row

FIG. 8
| LAYER | HAPTIC INFORMATION | EXAMPLE |
|---|---|---|
| 811 — SECOND LAYER (10cm~) | 821 — APPLY SAME DEGREE OF PRESSURE TO PALM SIDE OF FINGER | 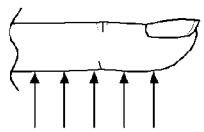 |
| 812 — FIRST LAYER (0~10cm) | 822 — APPLY DIFFERENT DEGREES OF PRESSURE TO PALM SIDE OF FINGER | 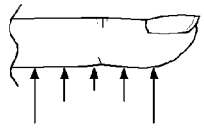 |
| 813 — A LAYER (0~5cm) | 823 — APPLY MINOR PRESSURE AROUND FINGER | 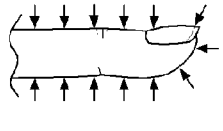 |
| 814 — B LAYER (5cm~) | 824 — APPLY GREAT PRESSURE AROUND FINGER | 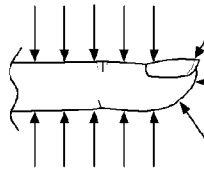 |

APPARATUS AND METHOD FOR ADJUSTING HOLOGRAPHIC IMAGE

CROSS-REFERENCE TO RELATED APPLICATIONS

This application claims the priority benefit of Korean Patent Application No. 10-2012-0101411, filed on Sep. 13, 2012, in the Korean Intellectual Property Office, the disclosure of which is incorporated herein by reference.

BACKGROUND

1. Field

One or more example embodiments of the following description relate to a technology of processing a holography object.

2. Description of the Related Art

Recently, with a more releases of 3-dimensional (3D) stereoscopic movies and greater development in 3D display technologies that home 3D TV with or without glasses, interest in a 3D image production technology is increasing. Thus, a 3D stereoscopic image technology, sometimes called the hero of next-generation 3D information terminal technology, is being used in wide industrial fields including movies, broadcasting, entertainment, aerospace, the military, the medical field, and the like and is expected to be an influential technology.

Accordingly, as one of the 3D stereoscopic image technology, a binocular disparity method is being developed, which uses a fact that left and right human eyes receive different images due to a difference in positions of the left and right eyes and a brain accept the images as a stereoscopic image.

However, stereoscopy may cause headaches and dizziness to people due to image arrangement, optical distortion, stereoscopic image capturing and display device setting performed without sufficient consideration of camera setting for adjustment of a stereoscopic effect and a sensitive aspect, flicker generated by alternate projection of left images and right images, distortion of the stereoscopic image caused by an excessive protrusion effect, and the like.

A holography technology is developed to overcome the aforementioned limits of the binocular disparity method. In general, a human perceives a 3D object by light reflected from the object. Therefore, an actual object shape may be implemented as long as light of the object is generated. A hologram technology implementing the light makes object waves reflected from the object using a laser beam meet another laser beam coming from another direction and records the object waves onto a photo film together. Here, when the light from two directions meet, interference fringes are generated due to a phase difference of the object wave reflected from each portion of the object. On the interference fringes, an amplitude and a phase of the object are recorded together. A photo film recording the shape of the object in the form of the interference fringes is referred to as a hologram. A technology for hologram recording is referred to as holography.

In addition to the technology of expressing an image by the hologram, a technology for changing and manipulating a hologram image by touch or manipulation by a user is also being researched.

SUMMARY

The foregoing and/or other aspects are achieved by providing a holographic object processing apparatus including a display device to output a holographic object, a database (DB) to store change information of the holographic object according to a distance between a control object and the holographic object, a distance measurement sensor to measure the distance between the control object and the holographic object, and a processing unit to extract change information corresponding to the measured distance from the DB and change the holographic object based on the extracted change information, wherein the display device outputs the changed holographic object.

The DB may include layer information to divide the distance between the control object and the holographic object into a plurality of regions according to distance, and a plurality of pieces of the change information corresponding to the plurality of regions, respectively.

The DB may further include haptic information based on the distance between the control object and the holographic object, and the processing unit may extract haptic information corresponding to the measured distance from the DB and transmit the extracted haptic information to a haptic actuator attached to at least one body portion of a user.

The haptic actuator may receive the extracted haptic information and implements a haptic sense based on the received haptic information.

The haptic information may include at least one selected from a shape feeling, a pressurized feeling, a heat feeling, and an oscillation.

The distance measurement sensor may measure a distance between the control object and a surface of the holographic object contacting the control object when the control object is located within the holographic object, the processing unit may extract change information corresponding to the measured distance from the DB and changes the holographic object based on the extracted change information, and the display device may output the changed holographic object.

The foregoing and/or other aspects are also achieved by providing an operation method for a holographic object processing apparatus, the operation method including outputting a holographic object, measuring a distance between a control object and the holographic object, extracting change information corresponding to the measured distance from a DB that stores change information of the holographic object based on the distance between the control object and the holographic object, changing the holographic object based on the extracted change information, and outputting the changed holographic object.

The operation method may further include extracting haptic information corresponding to the measured distance from the DB, and transmitting the extracted haptic information to a haptic actuator attached to at least one body portion of a user, wherein the DB further stores haptic information based on the distance between the control object and the holographic object.

The foregoing and/or other aspects are achieved by providing a holographic object processing apparatus that includes a device to output a holographic object, a distance measurement sensor to measure a distance between a control object and the output holographic object, and a processing unit to change the holographic object according to the distance measured by the distance measurement sensor.

The foregoing and/or other aspects are achieved by providing a holographic object interaction system that includes a device to output a holographic object, a haptic actuator attached to at least one body portion of a user, a distance measurement sensor to measure a distance between the body portion of the user and the output holographic object; and a processing unit to change the holographic object and to transmit haptic information to the haptic actuator according to the distance measured by the distance measurement sensor.

Additional aspects, features, and/or advantages of example embodiments will be set forth in part in the description which follows and, in part, will be apparent from the description, or may be learned by practice of the disclosure.

BRIEF DESCRIPTION OF THE DRAWINGS

These and/or other aspects and advantages will become apparent and more readily appreciated from the following description of the example embodiments, taken in conjunction with the accompanying drawings of which:

FIG. 3 illustrates change information stored in a database (DB) according to example embodiments;

FIG. 5 illustrates change information stored in a DB according to other example embodiments;

FIG. 8 illustrates haptic information stored in a DB according to example embodiments;

DETAILED DESCRIPTION

Figure 1:
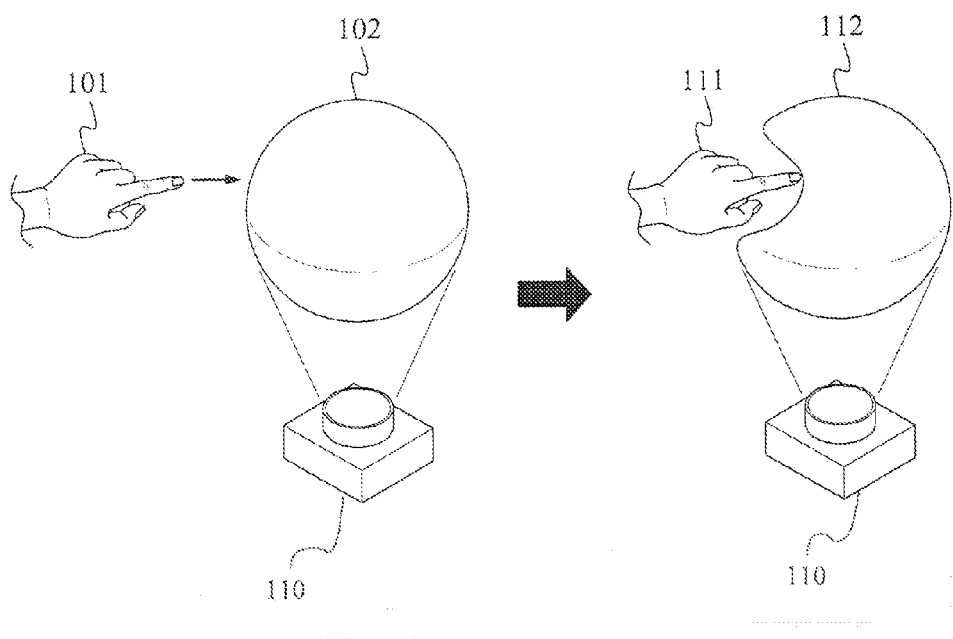
FIG. 1 illustrates an example operation of a holographic object processing apparatus according to example embodiments.

Reference will now be made in detail to example embodiments, examples of which are illustrated in the accompanying drawings, wherein like reference numerals refer to the like elements throughout.

In the present disclosure, if detailed descriptions of related disclosed art or configurations are determined to unnecessarily make the subject matter of the present disclosure obscure, they will be omitted. Terms to be used below are defined based on their functions in the present disclosure and may vary according to users, user's intentions, or practices. Therefore, the definitions of the terms should be determined in view of the entire specification.

FIG. 1 illustrates an example operation of a holographic object processing apparatus according to example embodiments.

Referring to FIG. 1, a display device of the holographic object processing apparatus 110 may output a holographic object. The holographic object may refer to an image, that is, an object, expressed by a hologram.

The holographic object processing apparatus 110 may display the holographic object and may also change the displayed holographic object according to interaction with a user or a control object.

Here, the control object refers to an object used by the user to control the holographic object. The control object may include a body part such as a hand, finger, or a foot of the user, or a device such as a stylus pen or a magic stick. That is, the user of the holographic object processing apparatus 110 may change or manipulate a shape or state of the holographic object using the control object.

When the control object is separated from the holographic object by a reference distance or more, the holographic object processing apparatus 110 may display an original holographic object on the display device without applying any dedicated change to the holographic object.

When the user extends a finger, for example, toward the holographic object, the holographic object processing apparatus 110 may change the holographic object according to a reference value and predetermined change details based on the distance between a finger tip of the user and the holographic object, and display the changed holographic object.

For example, the holographic object may be set to be changed into and displayed as a deformed shape when the control object is the finger of the user, the reference value is about 10 cm, and the separation distance between the finger and the holographic object is less than about 10 cm.

In this case, when a finger 101 is separated from the holographic object by a distance corresponding to the reference value or more, the holographic object processing apparatus 110 may display a ball 102 in a perfect spherical shape, that is, without changing the holographic object.

Conversely, when a distance between a finger tip 111 and the holographic object is the reference value or less, that is, about 10 cm or less, the holographic object processing apparatus 110 may change the holographic object from the spherical ball shape into a deformed ball shape 112, and display the changed holographic object, that is, the deformed ball shape 112.

Depending on embodiments, the holographic object processing apparatus 110 may display the changed holographic object by increasing a deformation degree of the ball according to a decrease in the distance between the finger tip 111 and the holographic object. That is, in an embodiment, the holographic object processing apparatus 110 may display the holographic object as being progressively more deformed as the finger tip 111 grows gradually closer to the holographic object, as illustrated in FIG. 1, for example.

Figure 2:
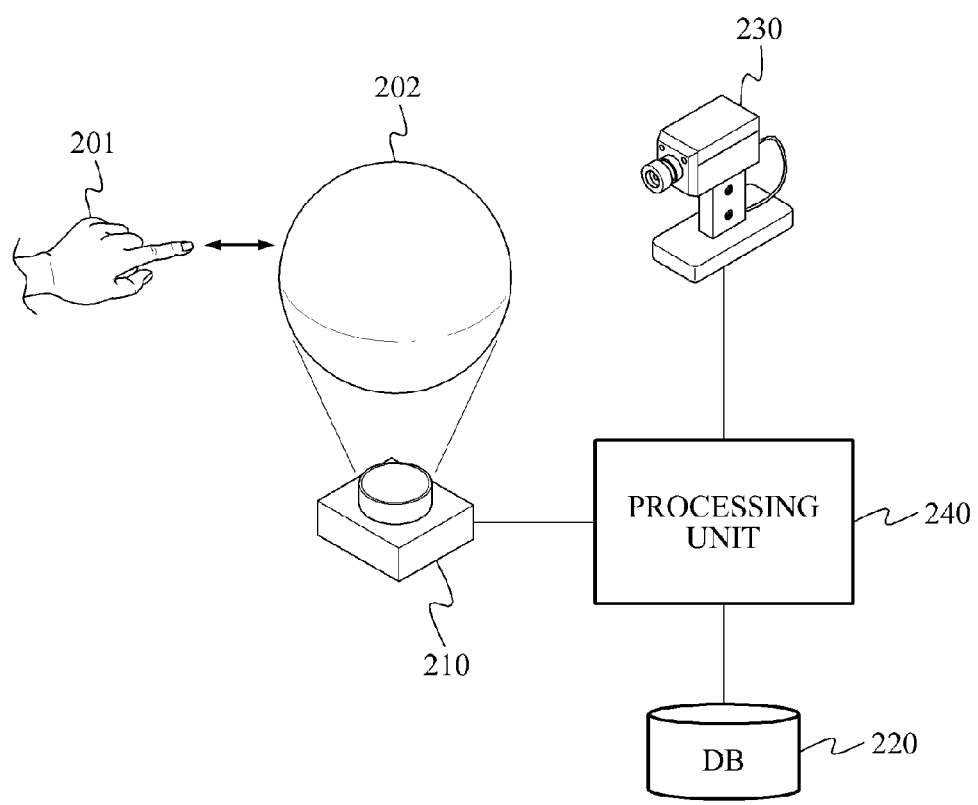
FIG. 2 illustrates a structure of a holographic object processing apparatus according to example embodiments.

FIG. 2 illustrates a structure of a holographic object processing apparatus according to example embodiments.

Referring to FIG. 2, the holographic object processing apparatus may include, for example, a display device 210, a database (DB) 220, a distance measurement sensor 230, and a processing unit 240.

The display device 210 may output a holographic object 202. The processing unit 240 may output the holographic object 202 to an input of the display device 210 to be displayed by the display device 210.

The DB 220 may store change information about the holographic object 202 that varies depending on a distance between a control object and the holographic object 202.

In further detail, the DB 220 may store layer information and change information per layer.

The layer information may refer to information relating to dividing the distance between the control object and the holographic object 202 into a plurality of regions, that is, layers, according to distance. The layer information may be predetermined.

The information per layer may refer to change information corresponding to each of the plurality of layers that divide the distance between the control object and the holographic object 202 according to distance.

For example, a first layer may be defined as a region in which the distance between the control object and the holographic object 202 is between about 0 cm and about 10 cm, a second layer may be defined as a region in which the distance is between about 10 cm and about 20 cm, and a third layer may be defined as a region in which the distance is greater than about 20 cm. In addition, the change information may be set in such a manner that: i) no change will be applied to the holographic object 202 when the control object is located in the third layer; ii) a color of the holographic object 202 will be changed when the control object is located in the second layer; and iii) a shape of the holographic object 202 will be changed into a deformed shape when the control object is located in the first layer. That is, the change information for changing the holographic object 202 may be set to respectively differ according to the layers, so that interaction between the control object and the holographic object 202 may be more clearly specified.

The change information may alternatively include information for changing the shape, the color, a resolution, a size, a texture, a brightness, a contrast, an output direction, and the like of the holographic object 202. For example, the change information may include information for deforming the shape of the holographic object 202, changing the color, reducing the resolution, increasing or decreasing the size, outputting the holographic object 202 upside down, changing the texture, the brightness, or the contrast, and the like.

Therefore, the holographic object processing apparatus may output the holographic object 202 changed according to the distance between the control object and the holographic object 202 based on the layer information and the change information stored in the DB 220.

Here, the distance measurement sensor 230 may measure the distance between the control object and the holographic object 202.

When the distance is measured by the distance measurement sensor 230, the processing unit 240 may extract the change information corresponding to the measured distance from the DB 220. Also, the processing unit 240 may change the holographic object 202 based on the extracted change information. When the holographic object 202 is changed, the display device 210 may output and display the changed holographic object 202. Hereinafter, the operation of the processing unit 240 will be described in detail with reference to FIGS. 3 and 4.

FIG. 3 illustrates change information stored in a DB according to example embodiments.

Referring to FIG. 3, a distance between a control object 201 and the holographic object 202 may be set to three regions, that is, three layers, according to distance. For example, a first layer 311 may refer to a region in which the distance between the control object 201 and the holographic object 202 is between about 0 cm and about 10 cm. A second layer 312 may refer to a region in which the distance is between about 10 cm and about 20 cm. A third layer 313 may refer to a region in which the distance is greater than about 20 cm.

As change information corresponding to the respective layers 311, 312, and 313, change information 321 may be set to enlarge the holographic object 202 with respect to the first layer 311, change information 322 may be set to change a color of the holographic object 202 with respect to the second layer 312, and change information 323 may be set to apply no change to the holographic object 202 with respect to the third layer 313, as shown in the far-right column of FIG. 3.

Figure 4:
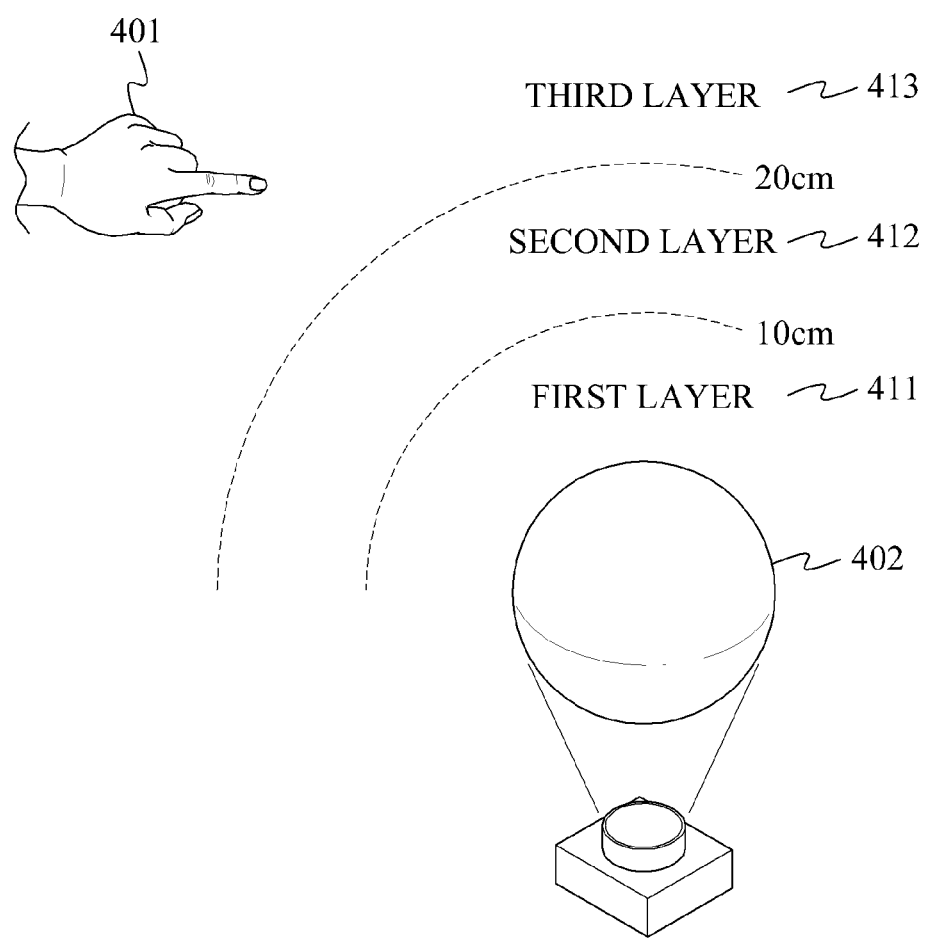
FIG. 4 illustrates a holographic object processing apparatus operating based on the change information of FIG. 3.

FIG. 4 illustrates a holographic object processing apparatus operating based on the change information of FIG. 3.

Referring to FIG. 4, the distance measurement sensor 230 may measure a distance between a control object 401 and a ball 402 in a perfect spherical shape such as the holographic object 202. When the distance is measured to be about 20 cm or more, for example 30 cm, and therefore the control object 401 is determined to be located in a third layer 413, the processing unit 240 of the holographic object processing apparatus may continue displaying the holographic object 202 through the display device 210 without applying any change to the holographic object 202, based on the change information 323 corresponding to the third layer 413 stored in the DB 220, so that the holographic object 202 continues to be displayed as the ball 402 in the perfect spherical shape.

When the measured distance is between about 10 cm and about 20 cm, for example 15 cm, and therefore the control object 401 is determined to be located in the second layer 412, the processing unit 240 may change the color of the holographic object 202 based on the change information 322 corresponding to the second layer 412 stored in the DB 220 and display the holographic object 202 with the changed color through the display device 210.

When the measured distance is between about 0 cm and about 10 cm, for example 2 cm, and therefore the control object 401 is determined to be located in the first layer 411, the processing unit 240 may enlarge the holographic object 202 based on the change information 321 corresponding to the first layer 411 stored in the DB 220 and display the enlarged holographic object 202 through the display device 210.

Hereinafter, the holographic object processing apparatus will be described referring back to FIG. 2.

Since the holographic object 202 is an image expressed by distribution of light, the control object 201 is not able to directly touch the holographic object 202. The control object 201 may simply be disposed in a space displaying the holographic object 202. However, since the holographic object 202 does not have a physical surface, the control object 201 may pass through the holographic object 202. That is, the control object 201 may be disposed within the holographic object 202.

Therefore, when the control object 201 is disposed within the holographic object 202, the distance measurement sensor 230 may measure a distance between the control object 201 and a surface of the holographic object 202 contacting the control object 201.

According to an embodiment, the holographic object 202 may be changed based on the distance between the surface of the holographic object 202 and the control object 201.

Here, the processing unit 240 may extract change information corresponding to the measured distance from the DB 220. That is, the DB 220 may store not only change information according to a distance that the control object is disposed outside of the holographic object 202 but also according to a distance that the control object is disposed within the holographic object 202.

In addition, the processing unit 240 may change the holographic object 202 based on the extracted change information. The display device 210 may output and display the change holographic object 202.

Hereinafter, the operation of the processing unit 240 of when the control object is located within the holographic object will be described with reference to FIGS. 5 and 6.

FIG. 5 illustrates change information stored in a DB according to other example embodiments.

Referring to FIG. 5, when the control object 201 is disposed within the holographic object 202, two regions, that is, two layers may be set according to a distance between the control object 201 and the holographic object 202.

The distance between the control object 201 and the holographic object 202 may be set in various manners. In the present embodiment, a distance between an endpoint, such as a finger tip, of the control object 201 and a surface of the holographic object 202 is measured as the distance between the control object 201 and the holographic object 202, although other measured distances may alternatively be used.

That is, an A layer 511 may refer to a region in which the distance between the control object 201 and the holographic object 202 within an inside region of the holographic object 202 is between about 0 cm and about 5 cm. A B layer 512 may refer to a region in which the distance is greater than about 5 cm.

As change information corresponding to the respective layers, change information 521 may be set to enlarge the holographic object 202 with respect to the A layer 511 and change information 522 may be set to reduce resolution of the holographic object 202 with respect to the B layer 512, as described in the middle column of FIG. 5 and as illustrated in the right column of FIG. 5.

Figure 6:
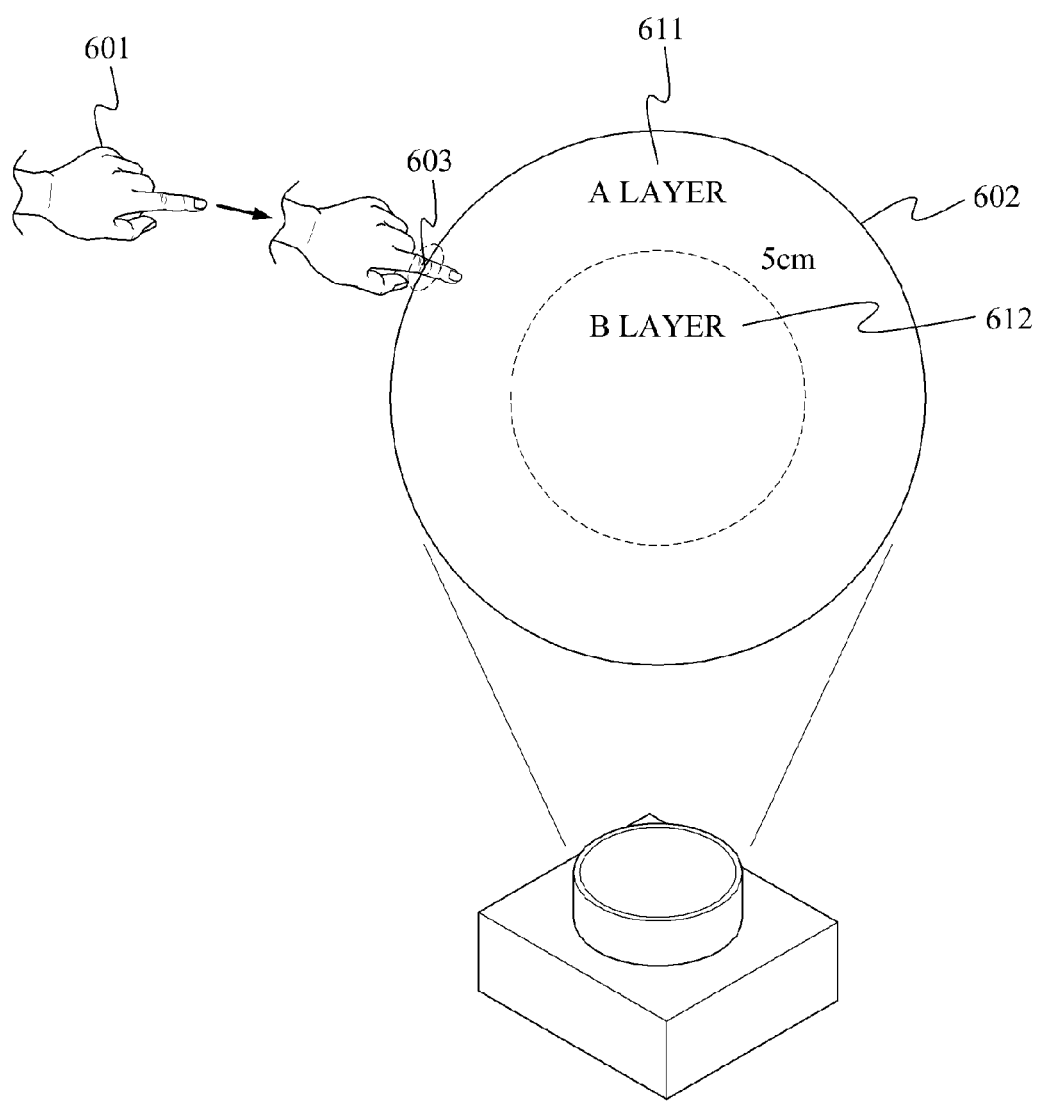
FIG. 6 illustrates a holographic object processing apparatus operating based on the change information of FIG. 5.

FIG. 6 illustrates a holographic object processing apparatus operating based on the change information of FIG. 5.

Referring to FIG. 6, the distance measurement sensor 230 may measure a distance between a control object 601 and a holographic object 602.

When the measured distance is between about 0 cm and 5 cm, for example 2 cm, and therefore the control object 601 is determined to be located within the A layer 611, the processing unit 240 may enlarge the holographic object 202 based on the change information 521 corresponding to the A layer 611 stored in the DB 220 and display the enlarged holographic object 202 through the display device 210.

When the measured distance is greater than about 5 cm, for example 7 cm, and therefore the control object 601 is determined to be located within the B layer 612, the processing unit 240 may reduce the resolution of the holographic object 202 based on the change information 522 corresponding to the B layer 612 stored in the DB 220 and display the holographic object 202 with the reduced resolution through the display device 210.

Referring back to FIG. 2, the holographic object processing apparatus may provide a haptic sensation to a user according to the distance between the control object 201 and the holographic object 202 through an actuator.

That is, the holographic object processing apparatus may directly change the holographic object 202 according to the distance between the control object 201 and the holographic object 202 and, furthermore, the holographic object processing apparatus may provide or reproduce the haptic sensation to the user through the actuator according to the distance between the control object 201 and the holographic object 202, thereby providing the user with a more realistic sense of manipulating the holographic object 202.

Here, the DB 220 may further include haptic information that varies according to the distance between the control object 201 and the holographic object 202. The haptic information may include at least one of a shape feeling, a pressure sensation, a prickly sensation, a pinching sensation, a constricting sensation, a tingling feeling, a vibration, a heat feeling, and an oscillation.

When the distance is measured by the distance measurement sensor 230, the processing unit 240 may extract the haptic information corresponding to the measured distance from the DB 220. In addition, the processing unit 240 may transmit the extracted haptic information to a haptic actuator. The haptic actuator may be attached to the control object 201.

For example, when the control object 201 is a human finger, the haptic actuator may be designed in a thimble form to be attached to the finger or in a glove form to be worn on a hand. The haptic actuator may receive the haptic information extracted from the holographic object processing apparatus and implement the haptic sense based on the haptic information.

Hereinafter, the operation of the haptic actuator and the holographic object processing apparatus for providing the haptic sense will be described with reference to FIGS. 7 to 9.

Figure 7:
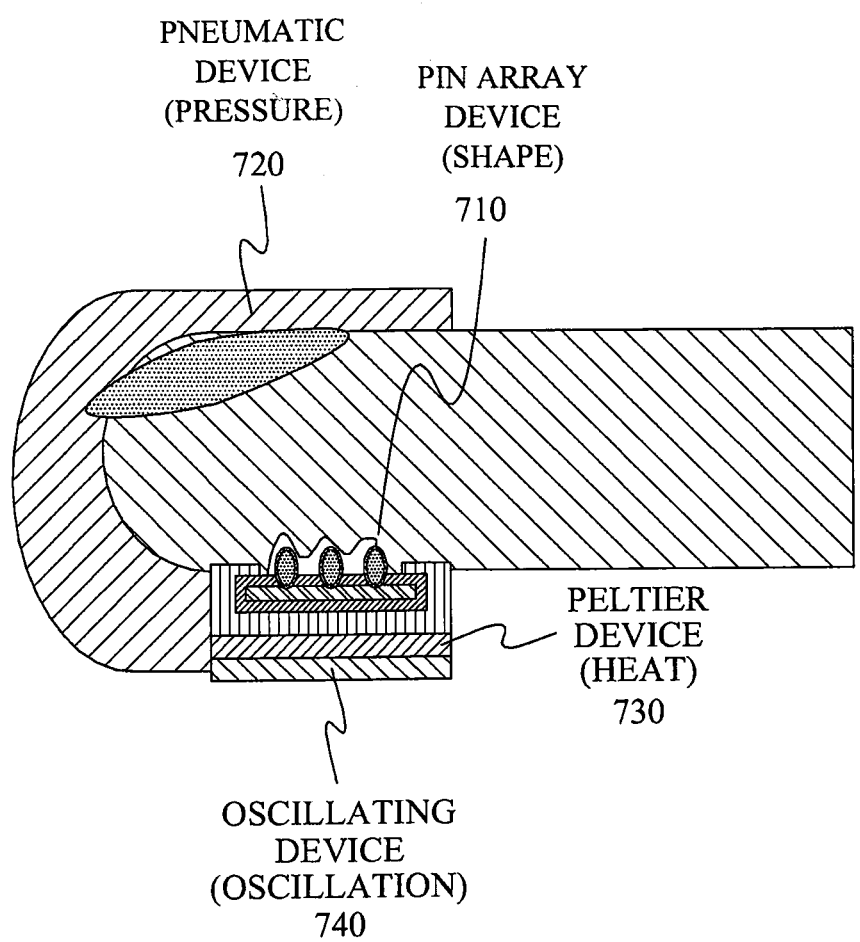
FIG. 7 illustrates a haptic actuator according to example embodiments.

FIG. 7 illustrates a haptic actuator according to example embodiments.

Referring to FIG. 7, the haptic actuator may include at least one device selected from a pin array device 710, a pneumatic device 720, a Peltier device 730, and an oscillating device 740.

FIG. 7 illustrates an example in which the control object 201 is a human finger. However, the design may be implemented in various manners.

The pin array device 710 may provide the user with a shape by adjusting a height of a pin according to haptic information.

The pneumatic device 720 may provide the user with a pressurized sense by adjusting a pressure degree according to the haptic information.

The Peltier device 730 may provide the user with a heat feeling by adjusting temperature according to the haptic information.

The oscillating device 740 may provide the user with an oscillation by adjusting oscillation intensity according to the haptic information. Or, an alternative device may be used to provide any other sensation including but not limited to the prickly sensation, pinching sensation, constricting sensation, tingling sensation, or vibration described above.

FIG. 8 illustrates haptic information stored in a DB according to example embodiments.

Referring to FIG. 8, a distance between the control object 201 and the holographic object 202 may be set to two regions, that is, a first layer 812 and a second layer 811 according to distance.

Additionally, when the control object 201 is disposed within the holographic object 202, two regions, that is, an A layer 813 and a B layer 814 may be set according to distance between the control object 201 and the holographic object 202.

That is, the first layer 812 refers to a region in which the distance between the control object 201 and the holographic object 202 is between about 0 cm and about 10 cm. The second layer 811 refers to a region in which the distance is greater than about 10 cm.

The A layer 813 refers to a region in which a distance between the control object 201 and a surface of the holographic object 202 within an inside region of the holographic object 202 is between about 0 cm and about 5 cm. The B layer 814 refers to a region in which the distance is greater than about 5 cm.

As haptic information corresponding to the respective layers, haptic information 821 may be set to apply a same degree of pressure to a palm side of a finger with respect to the second layer 811. Haptic information 822 may be set to apply different degrees of pressure to the palm side of the finger with respect to the first layer 812. Therefore, in a case in which the holographic object 202 is a ball with an uneven surface, when a distance between a finger tip to the holographic object 202 is relatively long, for example about 15 cm, the same degree of pressure is applied to the to the palm side of the finger through the haptic actuator. Therefore, the user may have the sensation of the surface of the holographic object 202 being smooth. However, when the distance between the finger tip of the user and the holographic object 202 becomes relatively short, for example about 5 cm, different degrees of pressure may be applied to the palm side of the finger through the haptic actuator. Accordingly, the user may have the sensation of the surface of the holographic object 202 being uneven.

In addition, haptic information 823 may be set to apply a relatively minor pressure around a finger with respect to the A layer 813. Haptic information 824 may be set to apply a relatively great pressure around the finger with respect to the B layer 814. Therefore, when the finger tip gets within the holographic object 202 by a short distance, for example about 2 cm, the relatively minor pressure may be applied around the finger through the haptic actuator. However, when the finger tip keeps moving and gets deep within the holographic object 202, for example by about 7 cm, the relatively great pressure may be applied around the finger through the haptic actuator. Therefore, the user may feel more pressure as the finger gets deeper into the holographic object 202.

Figure 9:
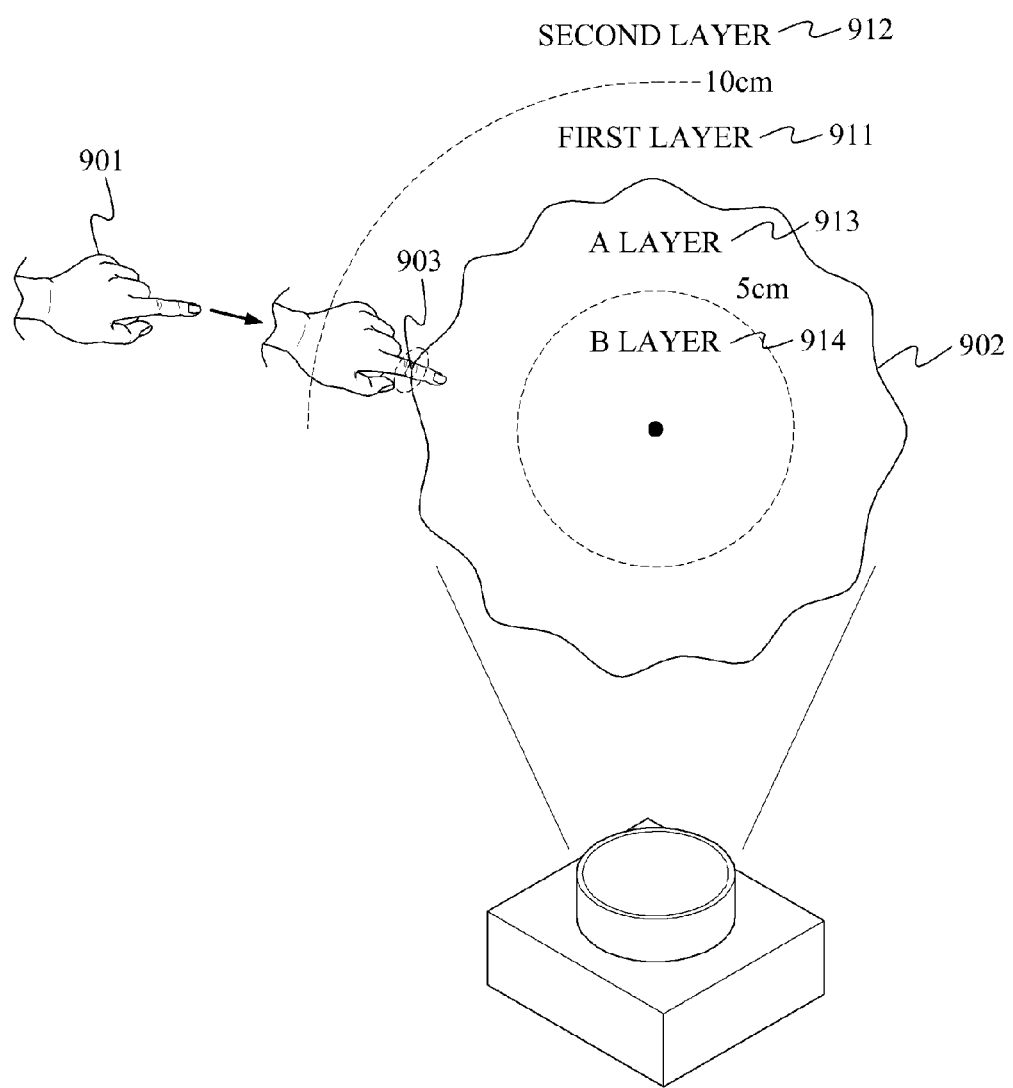
FIG. 9 illustrates a holographic object processing apparatus operating based on the haptic information of FIG. 8.

FIG. 9 illustrates a holographic object processing apparatus operating based on the haptic information of FIG. 8.

Referring to FIG. 9, the distance measurement sensor 230 may measure a distance between a control object 901 and an uneven ball 902 as a holographic object 902. When the distance is measured to be about 10 cm or more, for example about 20 cm, and therefore the control object 901 is determined to be in a second layer 912, the processing unit 240 of the holographic object processing apparatus may extract haptic information corresponding to the second layer 912 stored in the DB 220 and transmit the haptic information to the haptic actuator. Here, the haptic actuator may apply the same degree of pressure over the palm side of the finger based on the received haptic information.

When the measured distance is between about 0 cm and about 10 cm, for example 2 cm, and therefore the control object 901 is determined to be in a first layer 911, the processing unit 240 may extract haptic information corresponding to the first layer 911 stored in the DB 220 and transmit the haptic information to the haptic actuator. Here, the haptic actuator may apply different degrees of pressure to the palm side of the finger based on the received haptic information.

In addition, when the control object 901 is disposed within the holographic object 902, the distance measurement sensor 230 may measure a distance between the control object 901 and the holographic object 902.

When the measured distance is between about 0 cm and about 5 cm, for example 2 cm, and therefore the control object 901 is determined to be in an A layer 913, the processing unit 240 may extract haptic information corresponding to the A layer 913 stored in the DB 220 and transmit the haptic information to the haptic actuator. Here, the haptic actuator may apply a relatively minor pressure around the finger based on the received haptic information.

When the measured distance is greater than about 5 cm, for example 7 cm, and therefore the control object 901 is determined to be in a B layer 914, the processing unit 240 may extract haptic information corresponding to the B layer 914 stored in the DB 220 and transmit the haptic information to the haptic actuator. Here, the haptic actuator may apply a relatively great pressure around the finger based on the received haptic information.

It is noted that the change information described with reference to FIGS. 2 to 6 and the haptic information described with reference to FIGS. 8 and 9 may be simultaneously applied to the holographic object processing apparatus.

Figure 10:
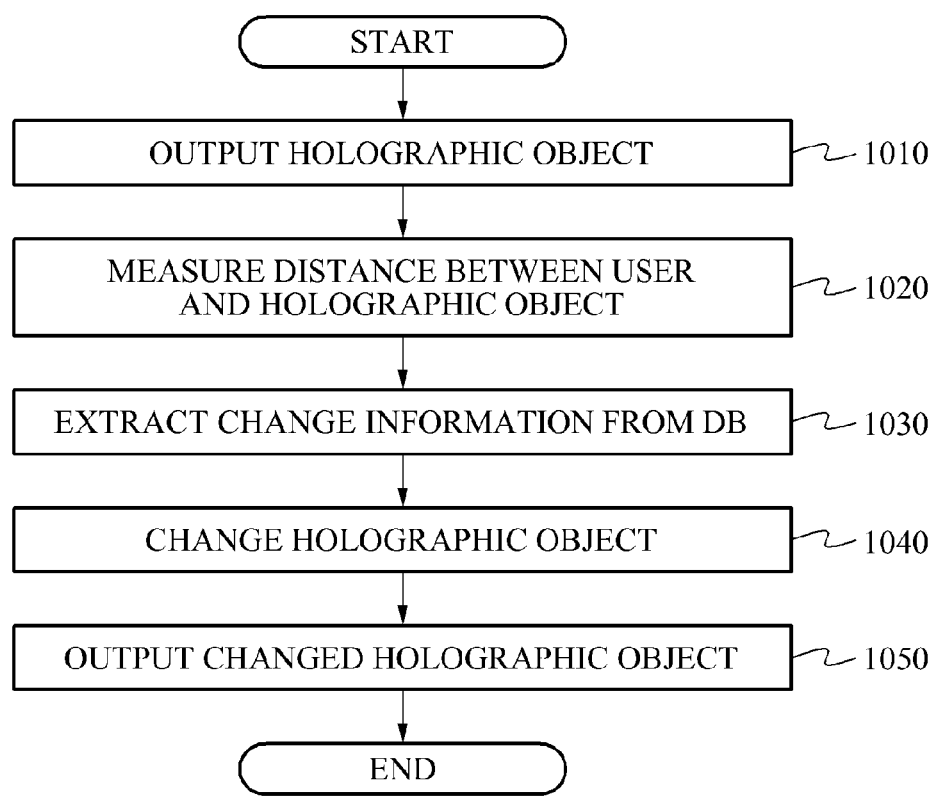
FIG. 10 illustrates an operation flow of a holographic object processing apparatus according to example embodiments.

FIG. 10 illustrates an operational flow of a holographic object processing apparatus according to example embodiments.

Referring to FIG. 10, the operation method of the holographic object processing apparatus may output a holographic object in 1010.

The operation method of the holographic object processing apparatus may store change information of the holographic object according to a distance between a control object and the holographic object in a DB.

In further detail, the operation method of the holographic object processing apparatus may store layer information and change information according to layer in the DB. The layer information may refer to information dividing the distance between the control object and the holographic object into a plurality of layers according to distance. The layer information may be predetermined.

The information per layer may refer to change information corresponding to each of the plurality of layers that divide the distance between the control object and the holographic object according to distance.

The change information may include information for changing a shape, color, resolution, size, output direction, and the like of the holographic object.

The operation method of the holographic object processing apparatus may include measuring the distance between the control object and the holographic object in operation 1020. According to example embodiments, the operation method of the holographic object processing apparatus may measure the distance between the control object and the holographic object. That is, the operation method of the holographic object processing apparatus may detect the control object located nearest to the holographic object by measuring the distance between the control object and the holographic object, and measure a distance between the detected control object and the holographic object.

When the distance between the control object and the holographic object is measured, the operation method of the holographic object processing apparatus may extract change information corresponding to the distance from the DB in operation 1030.

In addition, the operation method of the holographic object processing apparatus may change the holographic object based on the extracted change information in operation 1040.

When the holographic object is changed, the operation method of the holographic object processing apparatus may output and display the changed holographic object in operation 1050.

When the control object is located within the holographic object, the operation method of the holographic object processing apparatus may measure the distance between the holographic object and the control object.

According to one or more example embodiments, by measuring a distance between the control object and a surface of the holographic object, the surface contacting the control object getting into the holographic object, the operation method of the holographic object processing apparatus may measure an entering distance of the control object getting deepest into the holographic object, for example a finger tip.

Here, the operation method of the holographic object processing apparatus may extract change information corresponding to the measured distance from the DB. That is, the DB may store not only the change information per layer of which the control object is located outside of the holographic object but also the change information per layer of which the control object is located within the holographic object.

In addition, the operation method of the holographic object processing apparatus may change the holographic object based on the extracted change information. The operation method of the holographic object processing apparatus may output and display the changed holographic object through a display device.

According to an aspect, the operation method of the holographic object processing apparatus may provide a haptic sense to a user according to the distance between the control object and the holographic object through a haptic actuator.

That is, the operation method of the holographic object processing apparatus may directly change the holographic object according to the distance and, furthermore, the operation method of the holographic object processing apparatus may provide the haptic sense to the user through the actuator according to the distance, thereby providing the user with a more realistic sense of manipulating the holographic object.

Here, the DB may further include haptic information according to the distance between the control object and the holographic object. The haptic information may include at least one of a shape feeling, a pressure sensation, a prickly sensation, a pinching sensation, a constricting sensation, a tingling feeling, a vibration, a heat feeling, and an oscillation.

When the distance between the control object and the holographic object is measured, the operation method of the holographic object processing apparatus may extract the haptic information corresponding to the distance from the DB. In addition, the operation method of the holographic object processing apparatus may transmit the haptic information to the haptic actuator. Here, the haptic actuator may be attached to the control object.

The haptic actuator may receive the extracted haptic information from the holographic object processing apparatus and implement the haptic sense based on the haptic information.

The units described herein may be implemented using hardware components, software components, or a combination thereof. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The computer readable recording medium may include any data storage device that can store data which can be thereafter read by a computer system or processor. Examples of the computer readable recording medium include read-only memory (ROM), random-access memory (RAM), CD-ROMs, magnetic tapes, floppy disks, optical data storage devices. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein.

Any one or more of the software modules described herein may be executed by a dedicated processor unique to that unit or by a processor common to one or more of the modules. The described methods may be executed on a general purpose computer or processor or may be executed on a particular machine such as the holographic object processing apparatus or holographic object interaction system described herein.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A holographic object processing apparatus, comprising:
a display device configured to output a holographic object;
a distance measurement sensor configured to measure a distance between a control object and the holographic object; and
a processor configured to identify a region corresponding to the measured distance among regions, each region of the regions corresponding to range of distances from a visibly received outer border of the holographic object defining an outer boundary of a holographic image, to extract stored change information that corresponds to the identified region and to change the holographic object based on the extracted change information,
wherein the regions comprise at least one region that is between the center of the holographic object and the outer border of the holographic object, and wherein the change information comprises discrete change information corresponding to respective regions of the regions, each discrete change information acting to perform an action on at least one of the holographic image and a haptic actuator.

2. The holographic object processing apparatus of claim 1, further comprising a database (DB) configured to store the change information of the holographic object according to the distance between the control object and the holographic object, wherein the processing unit is configured to extract the exchange information from the DB and wherein the DB comprises:
   layer information to divide the distance between the control object and the holographic object into the plurality of regions according to distance; and
   a plurality of discrete segments of the change information, wherein each discrete segment corresponds to a different region of the plurality of regions.

3. The holographic object processing apparatus of claim 2, wherein
   the DB is further configured to store haptic information based on the distance between the control object and the holographic object, and
   the processing unit is configured to extract haptic information corresponding to the measured distance from the DB and transmit the extracted haptic information to the haptic actuator, the haptic actuator being attached to at least one body portion of a user.

4. The holographic object processing apparatus of claim 3, wherein the haptic actuator is configured to receive the extracted haptic information and produce a haptic sensation based on the received haptic information.

5. The holographic object processing apparatus of claim 3, wherein the haptic information comprises at least one selected from a shape feeling, a prickly sensation, a pinching sensation, a constricting sensation, a pressure sensation, a heat feeling, and an oscillation.

6. The holographic object processing apparatus of claim 1, wherein:
   the distance measurement sensor is configured to measure a distance between the control object and a surface of the holographic object contacting the control object when the control object is located within the holographic object; and
   wherein the processing unit is configured to extract change information corresponding to the measured distance from the DB and change the holographic object based on the extracted change information, and
   the display device is configured to output the changed holographic object.

7. The holographic object processing apparatus of claim 1, wherein the display device is configured to output the changed holographic object.

8. The holographic object processing apparatus of claim 1, wherein the change in the holographic object comprises changing the holographic object to be progressively more deformed as the distance between the control object and the holographic object measured by the distance measurement sensor changes.

9. A method of processing a holographic object, the method comprising:
   outputting, by a display device, a holographic object;
   measuring a distance between a control object and the holographic object;
   identifying a region corresponding to the measured distance among regions, each region of the regions corresponding to range of distances from a visibly received outer border of the holographic object defining an outer boundary of a holographic image;
   extracting stored change information that corresponds to the identified region; and
   changing the holographic object based on the extracted change information,
   wherein the regions comprise at least one region that is between the center of the holographic object and the outer border of the holographic object, and
   wherein the change information comprises discrete change information corresponding to respective regions of the regions, each discrete change information acting to perform an action on at least one of the holographic image and haptic actuator.

10. The method of claim 9, further comprising:
    extracting haptic information, corresponding to the measured distance, from a database (DB) that is configured to store the change information of the holographic object according to the distance between the control object and the holographic object; and
    transmitting the extracted haptic information to the haptic actuator, the haptic actuator configured to be attached to at least one body portion of a user,
    wherein the DB is further configured to store haptic information based on the distance between the control object and the holographic object.

11. The method of claim 10, wherein the haptic information comprises at least one selected from a shape feeling, a prickly sensation, a pinching sensation, a constricting sensation, a pressure sensation, a heat feeling, and an oscillation.

12. The method of claim 9, wherein the measuring a distance comprises:
    measuring a distance between the control object and a surface of the holographic object that contacts the control object when the control object is located within the holographic object;
    extracting change information corresponding to the measured distance from the DB;
    changing the holographic object based on the extracted change information; and
    outputting the changed holographic object using the display device.

13. The method of claim 9, wherein the display device is configured to output the changed holographic object.

14. The method of claim 9, wherein the changing of the holographic object based on the extracted change information comprises changing the holographic object to be progressively more deformed as the measured distance between the control object and the holographic object changes.

15. A computer readable recording medium storing a program to cause a computer to implement the method of claim 9.

16. A computer readable recording medium storing a program to cause a computer to implement the method of claim 10.

17. A holographic object processing apparatus, comprising:
    a device configured to output a holographic object;
    a distance measurement sensor configured to measure a distance between a control object and the output holographic object; and
    a processor configured to identify a region corresponding to the measured distance among regions, each region of the regions corresponding to range of distances from a visibly received outer border of the holographic object defining an outer boundary of a holographic image, and to change the holographic object according to the identified region, wherein the regions comprises at least one region that is between the center of the holographic object and the outer border of the holographic object, and wherein the change information comprises discrete change information corresponding to respective regions of the regions, each discrete change information acting to perform an action on at least one of the holographic image and a haptic actuator.

18. Object interaction system, comprising:
a device configured to output a holographic object;
a haptic actuator configured to be attached to at least one body portion of a user;
a distance measurement sensor configured to measure a distance between the body portion of the user and the output holographic object; and
a processor configured to identify a region corresponding to the measured distance among a plurality of regions, each region of the regions corresponding to range of distances from a visibly received outer border of the holographic object defining an outer boundary of a holographic image to change the holographic object and to transmit haptic information to the haptic actuator according to the identified region, wherein the regions comprise at least one region that is between the center of the holographic object and the outer border of the holographic object, and wherein the change information comprises discrete change information corresponding to respective regions of the regions, each discrete change information acting to perform an action on at least one of the holographic image and a haptic actuator.

19. The holographic object processing apparatus of claim 1, comprising an other region between the center of the holographic object and the outer border of the holographic object.

* * * * *